(12) United States Patent
Aldereguia et al.

(10) Patent No.: US 9,175,971 B1
(45) Date of Patent: Nov. 3, 2015

(54) IDENTIFYING COST EFFECTIVE ROUTES USING VEHICLE FUEL ECONOMY VALUES THAT ARE SPECIFIC TO THE ROADWAY TYPE

(71) Applicant: International Business Machines Corporation, Armonk, NY (US)

(72) Inventors: Alfredo Aldereguia, Cary, NC (US); Jeffrey R. Hamilton, Pittsboro, NC (US); Clifton E. Kerr, Durham, NC (US); Grace A. Richter, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 72 days.

(21) Appl. No.: 14/248,598

(22) Filed: Apr. 9, 2014

(51) Int. Cl.
  *G01C 21/34* (2006.01)
(52) U.S. Cl.
  CPC .................................. *G01C 21/3469* (2013.01)
(58) Field of Classification Search
  CPC ..... G08G 1/127; G08G 1/202; G01C 21/3469
  See application file for complete search history.

(56) References Cited

U.S. PATENT DOCUMENTS

| | | | |
|---|---|---|---|
| 6,005,494 A * | 12/1999 | Schramm ................. | 340/995.19 |
| 7,778,769 B2 * | 8/2010 | Boss et al. ..................... | 701/123 |
| 7,999,664 B2 * | 8/2011 | Barajas ...................... | 340/450.2 |
| 8,150,620 B2 | 4/2012 | Motoyama | |
| 8,290,695 B2 * | 10/2012 | Hiestermann et al. ........ | 701/119 |
| 8,392,109 B2 | 3/2013 | Liotopoulos et al. | |
| 8,467,960 B2 * | 6/2013 | Rinscheid ..................... | 701/416 |
| 8,543,287 B2 * | 9/2013 | Stevens et al. ............... | 701/33.4 |
| 8,630,792 B2 * | 1/2014 | Smith ........................... | 701/123 |
| 8,909,494 B2 * | 12/2014 | Lorden et al. ................. | 702/100 |
| 8,920,173 B1 * | 12/2014 | Fitzgerald et al. .............. | 434/62 |
| 9,046,379 B2 * | 6/2015 | Mineta ................................. | 1/1 |
| 2001/0018628 A1 | 8/2001 | Jenkins et al. | |

(Continued)

FOREIGN PATENT DOCUMENTS

| EP | 1842758 B1 | 9/2009 |
|---|---|---|
| EP | 2504663 A1 | 10/2012 |
| EP | 2506569 A1 | 10/2012 |

OTHER PUBLICATIONS

"ProposedAmendment_May 8, 2015"; Authored: Jeffery Streets; recieved: Aug. 5, 2015.*

(Continued)

*Primary Examiner* — James Trammell
*Assistant Examiner* — James E Stroud
(74) *Attorney, Agent, or Firm* — Katherine S. Brown; Jeffrey L. Streets

(57) ABSTRACT

Computer readable program instructions perform a method including identifying a starting location and a destination for traveling in a vehicle and identifying multiple available routes. Each route includes roadway segments that have a roadway type selected from multiple roadway types reflecting a set of roadway conditions. The method obtains a fuel price available to the vehicle, obtains a fuel economy value for the vehicle on each roadway type, and calculates a cost of driving each of a plurality of available routes. The cost of driving each available route is the sum of the cost of driving each segment of the route, wherein the cost of driving each roadway segment is the mathematical product of a length of the roadway segment and the available fuel price divided by the fuel economy for the vehicle on the roadway type for the roadway segment. The lowest cost route is then identified.

18 Claims, 6 Drawing Sheets

(56) References Cited

U.S. PATENT DOCUMENTS

| | | | |
|---|---|---|---|
| 2009/0005974 A1 | 1/2009 | Lenneman et al. |
| 2009/0109022 A1 | 4/2009 | Gangopadhyay et al. |
| 2011/0084849 A1 | 4/2011 | Young et al. |
| 2011/0160990 A1 | 6/2011 | Mineta |
| 2011/0307166 A1 | 12/2011 | Hiestermann et al. |
| 2013/0173147 A1 | 7/2013 | Takeuchi et al. |

OTHER PUBLICATIONS

Jovicic et al., "Route Optimization to Increase Energy Efficiency and Reduce Fuel Consumption of Communal Vehicles" Journal Ttl: Thermal Science, vol. 14, S,SI, Publisher: Vinca Inst Nuclear Sci; Country of Publication: Serbia; ISSN: 0354-9836; Database: SciSearch(R), May 25, 2010, pp. S67-S78.

cNet.com, "Trip Cost Calculator", http://download.cnet.com/Trip-cost-calculator/3000-20428_4-12921495.html, Trip cost calculator 1.24—Free download and software reviews—CNET Download.com Jan. 9, 2013, 7 pages.

AppBrain Android Market, "GPS Logger / Trip Recorder", http://www.appbrain.com/app/gps-logger-trip-recorder/codyscript.com.gpsrecorder, GPS logger / Trip recorder | AppBrain Android Market, Oct. 14, 2013, 3 pages.

Audi, "Assistance Systems Economical Route Guidance", http://www.audi-me.com/me/brand/en/Efficiency/efficiency_technologies/assistance_system, Economical route guidance > Assistance systems > Efficiency technologies > Audi, Oct. 14, 2013, 1 page.

Garmin International, Inc. "ecoRoute hd", Garmin | ecoRoute hd, http://www8.garmin.com/pr/ecoroutehd/, OLATHE, Kan./Jan. 5, 2010/Business Wire, 2 pages.

Maps.addonreviews.com, "Route Directions by Car" GPS Route Types GPS Review, http://www.gpsreview.net/gps-route-types/, Jan. 17, 2008, 4 pages.

Comspec, "GPS Vehicle Tracking / Fleet Managment", Comspec—Telecommunication Engineering, Design, and Consulting. GPS Navigation, http://www.comspec-hi.com/gps-tracking.html, Oct. 14, 2013, 2 pages.

GammaPoint, LLC, "Extra Mile—VoiceNavigation with GPS Trip and Mileage Tracker", iTunes Preview, https://itunes.apple.com/us/app/extra-mile-fuel-meter-trip/id439589978?mt=8, Extra Mile—Voice Navigation with GPS Trip and Mileage Tracker for iPhone, iPad, and i . . . , Sep. 20, 2013, 2 pages.

TomTom, "IQ Routes(tm)—Your most efficient route, using actual roadspeed data", http://www.tomtom.com/page/iq-routes?Lid=48, Oct. 14, 2013, 6 pages.

Explore, "ECOROUTE—Garmin", https://buy.garmin.com/en-US/US/prod106070.html, Oct. 14, 2013, 2 pages.

\* cited by examiner

Roadway Types

| Roadway Type | Speed Limit Range (MPH) | Stops (#/mile) |
|---|---|---|
| A | <30 | >5 |
| B | 31-50 | 0.5-4 |
| C | 51-65 | 0.01-0.49 |
| D | >66 | none |

FIG. 5

Vehicle Driving History

| Roadway Type | Fuel Economy (MPH) |
|---|---|
| A | 21 |
| A | 24 |
| B | 27 |
| C | 31 |
| B | 28 |
| A | 22 |
| B | 26 |
| C | 32 |
| D | 30 |
| C | 29 |
| B | 28 |
| A | 23 |

FIG. 6

Vehicle Fuel Economy

| Roadway Type | Fuel Economy |
|---|---|
| A | 22.5 |
| B | 27.25 |
| C | 30 |
| D | 30 |

FIG. 7

Route Cost Calculation

| Segment Number | Segment Type | Distance (miles) | Fuel Price ($/gal.) | Fuel Economy (MPG) | Toll ($) | Segment Cost ($) |
|---|---|---|---|---|---|---|
| 1 | A | 0.25 | 3.09 | 22.5 | – | .03 |
| 2 | A | 0.25 | 3.09 | 22.5 | – | .03 |
| 3 | B | 1.25 | 3.09 | 27.25 | – | .14 |
| 4 | C | 18 | 3.09 | 30 | – | 1.85 |
| 5 | D | 5 | 3.09 | 30 | 0.50 | 1.02 |
| 6 | B | 0.5 | 3.09 | 27.25 | – | .06 |
| 7 | A | 0.25 | 3.09 | 22.5 | – | .03 |
| 8 | A | 0.25 | 3.09 | 22.5 | – | .03 |

Total Route Cost ⟹ $3.19

FIG. 8

IDENTIFYING COST EFFECTIVE ROUTES USING VEHICLE FUEL ECONOMY VALUES THAT ARE SPECIFIC TO THE ROADWAY TYPE

BACKGROUND

1. Field of the Invention

The present invention relates to navigation systems and methods of mapping a route from one place to another.

2. Background of the Related Art

As automotive fuel prices have risen, the cost of traveling by automobile has also risen to become a greater proportion of a person's monthly expenses. Accordingly, there has been an increase in various efforts to purchase fuel at a low prices. Radio stations may announce low fuel prices reported by their listeners and websites may describe fuel prices at various locations around the country. Furthermore, online map programs or mobile navigation systems make it possible to quickly determine the distance from one address to another, while a GPS-enable mobile device can track its current location. Even the current design of automobiles reflects an increased focus on fuel efficiency, as many models now include systems that will calculate an instantaneous fuel efficiency of the automobile under current driving conditions.

Current navigation systems can use map data to calculate the fastest routes or shortest routes. Such systems use detailed map data to provide turn-by-turn directions to a driver and even recalculate a route when the driver misses a turn.

BRIEF SUMMARY

One embodiment of the present invention provides a computer program product comprising a computer readable storage medium having program instructions embodied therewith, and where the program instructions are executable by a processor to cause the processor to perform a method. The method comprises identifying a starting location and a destination for traveling in a vehicle and accessing map data identifying multiple available routes from the starting location to the destination. Each available route includes one or more roadway segments, wherein the map data identifies a roadway type for each roadway segment, and wherein the map data includes multiple roadway types, and each roadway type reflects a unique set of roadway conditions. The method further comprises obtaining a price of fuel available to the vehicle, obtaining a fuel economy value for the vehicle on each roadway type, and calculating a cost of driving each of a plurality of available routes. The cost of driving each available route is the sum of the cost of driving each of the one or more roadway segments included within the available route, wherein the cost of driving each roadway segment is the mathematical product of a length of the roadway segment and the price of fuel available to the vehicle divided by the fuel economy for the vehicle on the roadway type for the roadway segment. The method then identifies which of the available routes is the lowest cost route for driving the vehicle from the starting location to the destination.

BRIEF DESCRIPTION OF THE SEVERAL VIEWS OF THE DRAWINGS

FIG. 5 is a table representing various roadway types.

FIG. 6 is a table representing a vehicle driving history.

FIG. 7 is a table representing vehicle fuel economy for each roadway type.

FIG. 8 is a table representing a route cost calculation.

DETAILED DESCRIPTION

Figure 1:
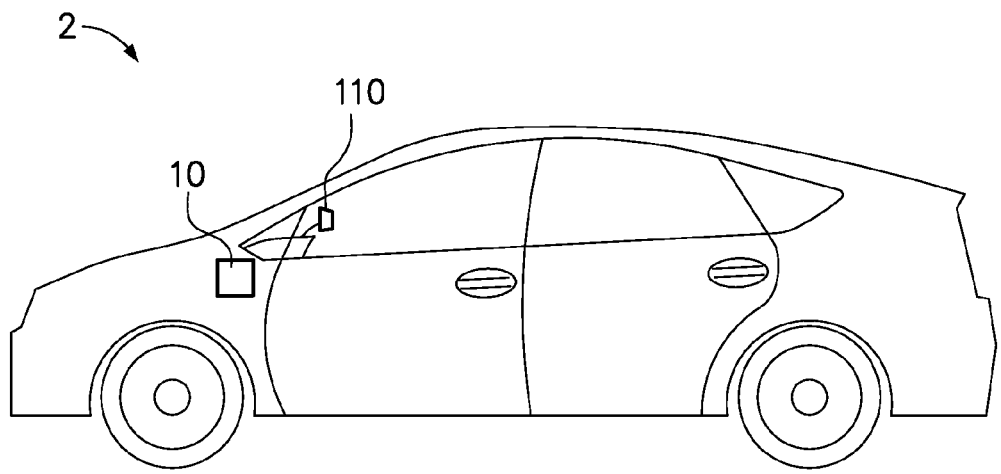
FIG. 1 is a diagram of a vehicle having a control system and a mobile device.

One embodiment of the present invention provides a method including identifying a starting location and a destination for traveling in a vehicle and accessing map data identifying multiple available routes from the starting location to the destination. Each available route includes one or more roadway segments, wherein the map data identifies a roadway type for each roadway segment, and wherein the map data includes multiple roadway types, and each roadway type reflects a unique set of roadway conditions. The method further comprises obtaining a price of fuel available to the vehicle, obtaining a fuel economy value for the vehicle on each roadway type, and calculating a cost of driving each of a plurality of available routes. The cost of driving each available route is the sum of the cost of driving each of the one or more roadway segments included within the available route, wherein the cost of driving each roadway segment is the mathematical product of a length of the roadway segment and the price of fuel available to the vehicle divided by the fuel economy for the vehicle on the roadway type for the roadway segment. The method then identifies which of the available routes is the lowest cost route for driving the vehicle from the starting location to the destination.

The method is preferably performed by one or more mobile device that accompanies the user in the automobile while traveling to the destination. Non-limiting examples of the mobile device may include handheld devices, such as a navigation system or a mobile phone, or devices integrated into the automobile, such as a vehicle control system. A destination may be identified by user entry, such as entering an address into a map program on the mobile device, selecting from a list of previously entered addresses or contacts, or merely finding and selecting the destination on a map display. The mobile device is preferably GPS-enabled, and may automatically identify a current location of the mobile device as the starting location. Since the map program then has access to the starting location and the destination, the map program is able to determine available routes from the starting location to the destination. Preferably, the mobile device will include a display screen and will display one or more of the available routes, such as the route identified as the lowest cost route for driving the vehicle from the starting location to the destination.

Each available route includes one or more roadway segments. A roadway segment may have any length or distance, and may, for example, be a portion of a particular street or highway that is part of the available route. A typical route will include multiple roadway segments, where each roadway segment may be of the same or different roadway type. For example, an available route from a starting location (i.e., user's home) to a destination (i.e., a family member in another city) may include one or more city streets from the user's home to a first highway, multiple highway changes, and then more city streets from the last highway to the home of the family member in the destination city. Each of these streets and highways may be a roadway segment with an associated set of roadway conditions, such as speed limits, number and types of stops, traffic levels, and the like. In a simple embodiment, each roadway segment is identified by a roadway type selected from a city street (a first roadway type) and a highway (a second roadway type). Further roadway types may distinguish between residential and through streets and distinguish between a highway and a freeway, such that there are four roadway types. Residential streets typically have lower speed limits and lots of stop signs, whereas a through streets will have somewhat higher speed limits and periodic stop lights. Highways may have significantly higher speed limits than a street and greater distances between stops or reduced speed limits, whereas a freeway doesn't have stops unless you exit the freeway. In this manner, the actual physical conditions of each roadway segment allow it to be identified as being of a particular roadway type. Any number of roadway types may be defined and used in accordance with the present invention.

A price of fuel available to the vehicle may be obtained in several ways. The fuel price might be received in a wireless communication from a refueling pump control system at the time the fuel tank of the vehicle is being filled. Non-limiting examples of wireless communication protocols that may be used include BlueTooth wireless technology or extended range NFC (near field communication) standards. Alternatively, a user may manually enter the fuel price into the mobile device. In a further alternative that is perhaps less accurate but more comprehensive for long distances, the price of fuel available to the vehicle may be obtained by accessing a database of refueling locations and fuel prices associated with each of the refueling locations. In other words, while actual purchase prices are the most accurate, actual purchase prices are not yet available when planning a long trip that will require refueling. The use of the database of refueling locations allows for a realistic estimate accounting for geographic variations in fuel price, rather than assuming that all fuel for the trip will be purchased at the same price.

In one option, a fuel economy value for the vehicle on each roadway type may be obtained by storing a driving history for the vehicle. The driving history is preferably stored in memory associated with a vehicle control system, such that the vehicle control system may communicate the first fuel economy and the second fuel economy to a separate navigation device using short range wireless communication. The driving history includes a first fuel economy measured over a plurality of roadway segments of a first roadway type and a second fuel economy measured over a plurality of roadway segments of a second roadway type, wherein fuel economy is a measure of distance traveled per quantity of fuel. A vehicle control system may monitor the vehicle user and performance and store the driving history data for use in determining the fuel economy on various roadway types. In one example, the driving history for the vehicle may include vehicle speed, wherein the first fuel economy is measured over roadway segments where the vehicle speed is less than a setpoint speed, and the second fuel economy is measured over roadway segments where the vehicle speed is greater than the setpoint speed. In another example, the driving history for the vehicle includes vehicle stops, wherein the first fuel economy is measured over roadway segments where the vehicle stops are more frequent than a setpoint frequency, and the second fuel economy is measured over roadway segments where the vehicle stops are less frequent than the setpoint frequency. In yet another example, the first roadway type is a city street and the second roadway type is a highway, such that a fuel economy value for the vehicle on each roadway type may be obtained by receiving a published value for city fuel economy and a published value for highway fuel economy. Vehicle manufacturers publish city and highway fuel economy values for each make, model and year of vehicle.

Various options may be used for using the map data to identify a roadway type for each roadway segment. In one simple example, a roadway segment may be identified as a second segment type if the roadway segment has a highway designation, and a roadway segment may be identified as a first segment type if the roadway segment does not have a highway designation. In another option, a roadway segment may be identified as a first segment type if the roadway segment has greater than a setpoint number of stops per distance, and a roadway segment may be identified as a second segment type if the roadway segment has less than a setpoint number of stops per distance. In a further option, a roadway segment may be identified as a first segment type if the roadway segment has a speed limit less than a setpoint speed, and a roadway segment may be identified as a second segment type if the roadway segment has a speed limit greater than a setpoint speed. Any number and type of roadway conditions may be used to distinguish between roadway types.

Optionally, one or more vehicles may report actual roadway driving conditions as they travel over various roadway segments, such that the map data may better reflect actual roadway conditions. For example, actual roadway driving conditions may reflect special temporary construction zone speed limits or steadily increasing traffic delays at certain stop lights at certain times of day or over years as a neighborhood grows.

In a further embodiment, the map data may further identify any toll amount charged for traveling through each roadway segment. Accordingly, the toll amount associated with each roadway segment is added to the cost of driving the roadway segment.

The methods of the present invention may further comprise displaying, on a display screen, the identified route and the cost associated with driving the vehicle from the starting location to the destination following the identified route. Optionally, the method may further include displaying, on the display screen, an alternative route and the cost associated with driving the vehicle from the starting location to the destination following the alternative route. For example, the identified route is the lowest cost route for driving the vehicle from the starting location to the destination, but the alternative route may be the fastest or shortest route from the starting location to the destination. In a further option, the method may include displaying, on the display screen, an estimated duration of traveling the identified route and an estimated duration of traveling the alternative route. Displaying both the identified (lowest cost) and alternative routes and their respective costs shows the user the tradeoffs between the two routes, such as the difference in cost and the difference in duration.

Another embodiment of the present invention provides a computer program product comprising a computer readable storage medium having program instructions embodied therewith, and where the program instructions are executable by a processor to cause the processor to perform a method. The method comprises identifying a starting location and a destination for traveling in a vehicle and accessing map data identifying multiple available routes from the starting location to the destination. Each available route includes one or more roadway segments, wherein the map data identifies a roadway type for each roadway segment, and wherein the map data includes multiple roadway types, and each roadway type reflects a unique set of roadway conditions. The method further comprises obtaining a price of fuel available to the vehicle, obtaining a fuel economy value for the vehicle on each roadway type, and calculating a cost of driving each of a plurality of available routes. The cost of driving each available route is the sum of the cost of driving each of the one or more roadway segments included within the available route, wherein the cost of driving each roadway segment is the mathematical product of a length of the roadway segment and the price of fuel available to the vehicle divided by the fuel economy for the vehicle on the roadway type for the roadway segment. The method then identifies which of the available routes is the lowest cost route for driving the vehicle from the starting location to the destination.

The foregoing computer program products may further include program instructions for implementing or initiating any one or more aspects of the methods described herein. Accordingly, a separate description of the methods will not be duplicated in the context of a computer program product.

FIG. 1 is a diagram of a vehicle 2 having a control system 10 and carrying a mobile device 110. While the functions of attributed to the mobile device 110 may be integrated into the control system 10, the present embodiment describes the mobile device 110 as being a separate device that can communicate with the control system 10.

Figure 2:
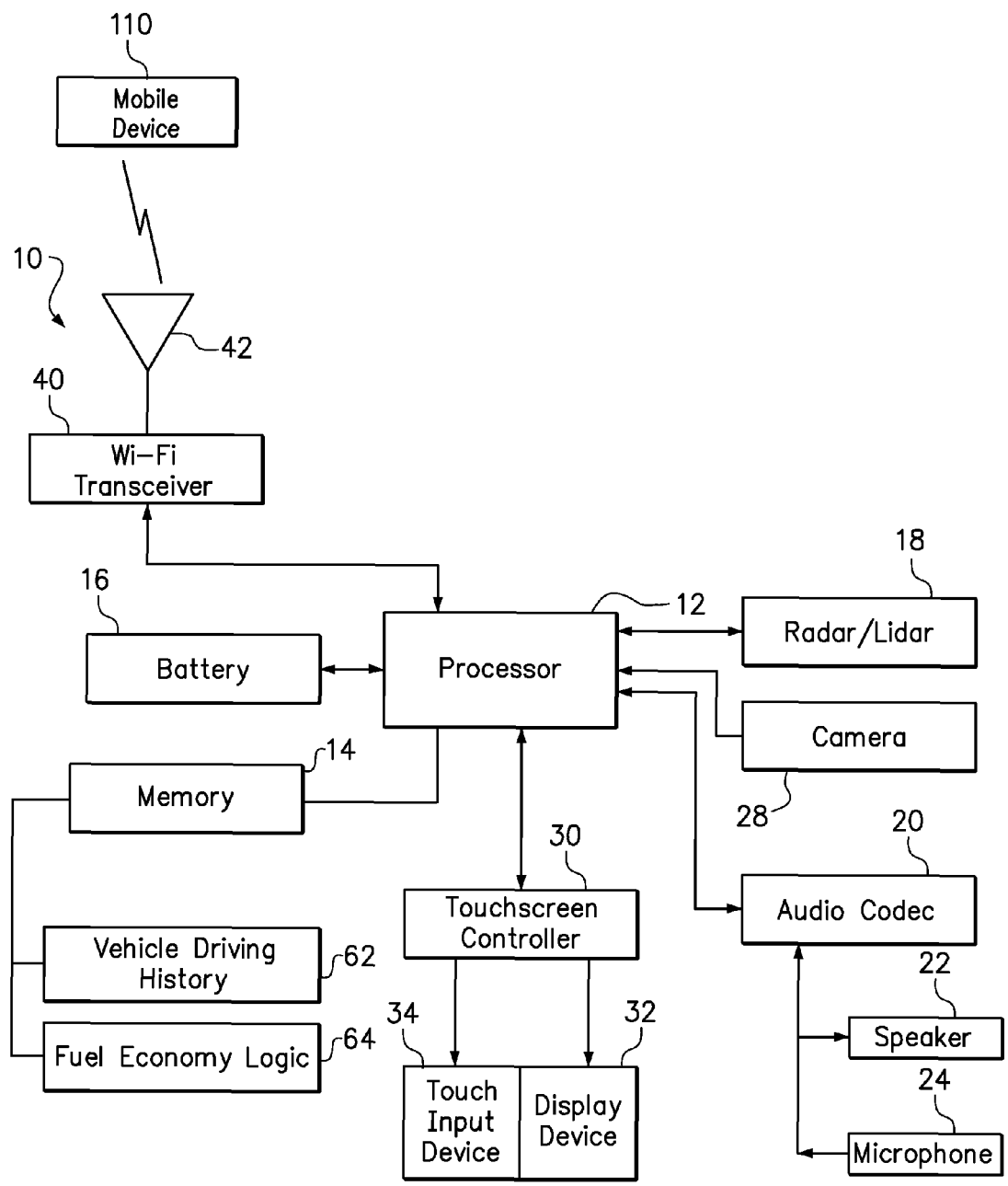
FIG. 2 is a block diagram of vehicle control system.

FIG. 2 is a block diagram of the vehicle control system 10, capable of determining an actual fuel economy of the vehicle over various roadway types in accordance with one embodiment of the invention. The vehicle control system 10 may include a processor 12, memory 14, a battery 16, a universal serial bus (USB) port 18, a camera 28, and an audio codec 20 coupled to a speaker 22, and a microphone 24. The vehicle control system 10 may further include a touchscreen controller 30 which provides a graphical output to the display device 32 and an input from a touch input device 34. Collectively, the display device 32 and touch input device 34 may be referred to as a touchscreen.

The vehicle control system 10 may also include a Wi-Fi (wireless local area network) transceiver 40 and corresponding antenna 42 allowing the device to communicate directly with the mobile device 110. The vehicle control system 10 also has memory 14 providing data storage and logic functions, such as a vehicle driving history 62 and fuel economy logic 64.

Figure 3:
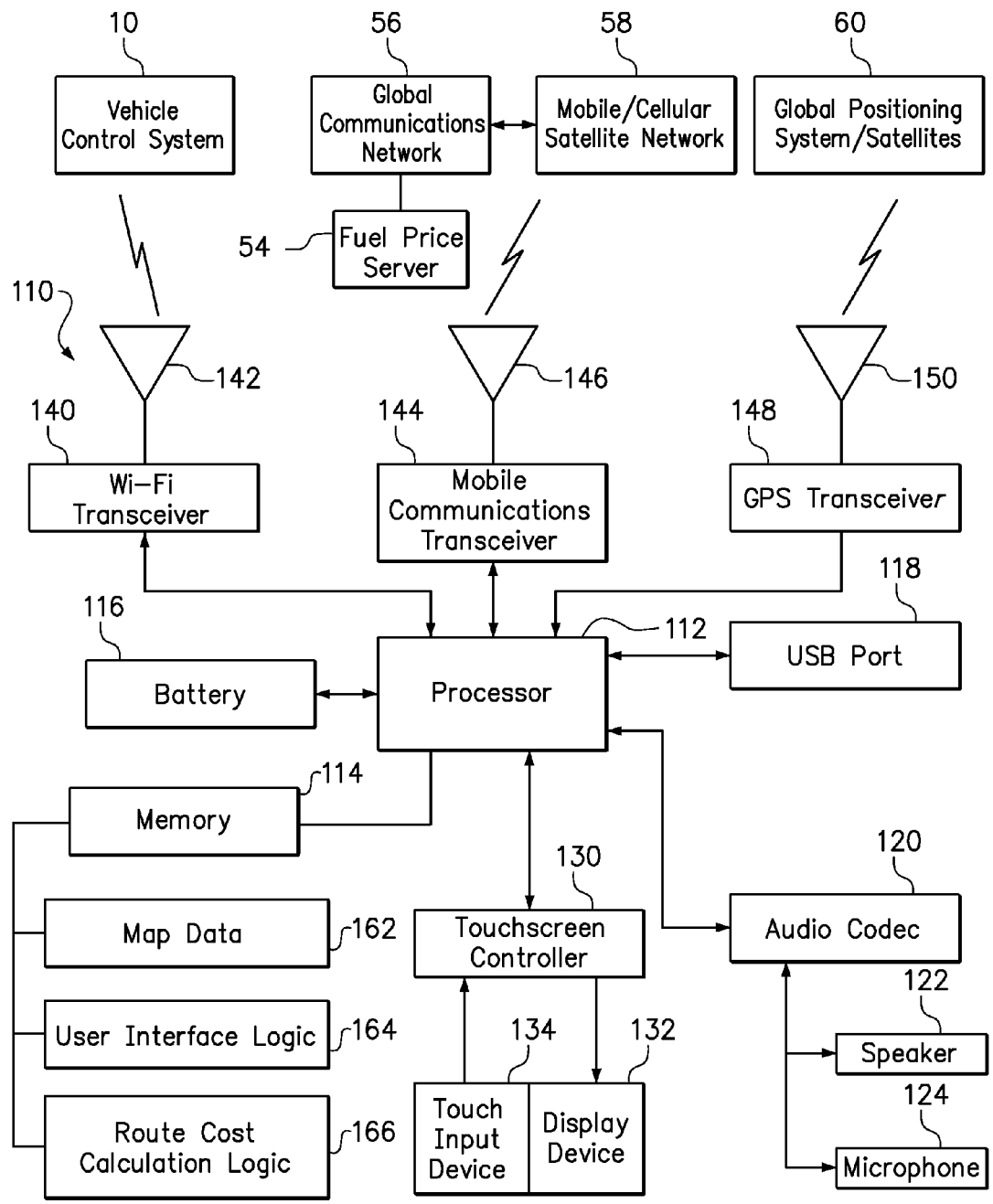
FIG. 3 is a block diagram of mobile device.

FIG. 3 is a block diagram of a mobile device 110, such as a navigation system or smart phone capable of determining a lowest cost route in accordance with one embodiment of the invention. The mobile device 110 may include a processor 112, memory 114, a battery 116, a universal serial bus (USB) port 118, and an audio codec 120 coupled to a speaker 122 and a microphone 124. The mobile device 110 may further include a touchscreen controller 130 which provides a graphical output to the display device 132 and an input from a touch input device 134. Collectively, the display device 132 and touch input device 134 may be referred to as a touchscreen.

The mobile device 110 may also include a Wi-Fi (wireless local area network) transceiver 140 and corresponding antenna 142 allowing the mobile device to communicate directly with the vehicle control system 10, a mobile communication transceiver 144 and corresponding antenna 146 allowing the mobile device to communicate over a mobile/cellular network 58, and a global positioning system (GPS) transceiver 148 and corresponding antenna 150 allowing the device to obtain signals from a global positioning system or satellites 60. In a non-limiting example, the mobile/cellular network 58 may be connected to a global communications network 56, such as the Internet, providing access to a fuel price server 54 for the purpose of acquiring the location of refueling stations along a selected route and a current fuel price being offered at each of the refueling stations. The mobile device 110 has memory 14 for storing data and logic functions, such as map data 162, user interface logic 164, and route cost calculation logic 166.

Figure 4:
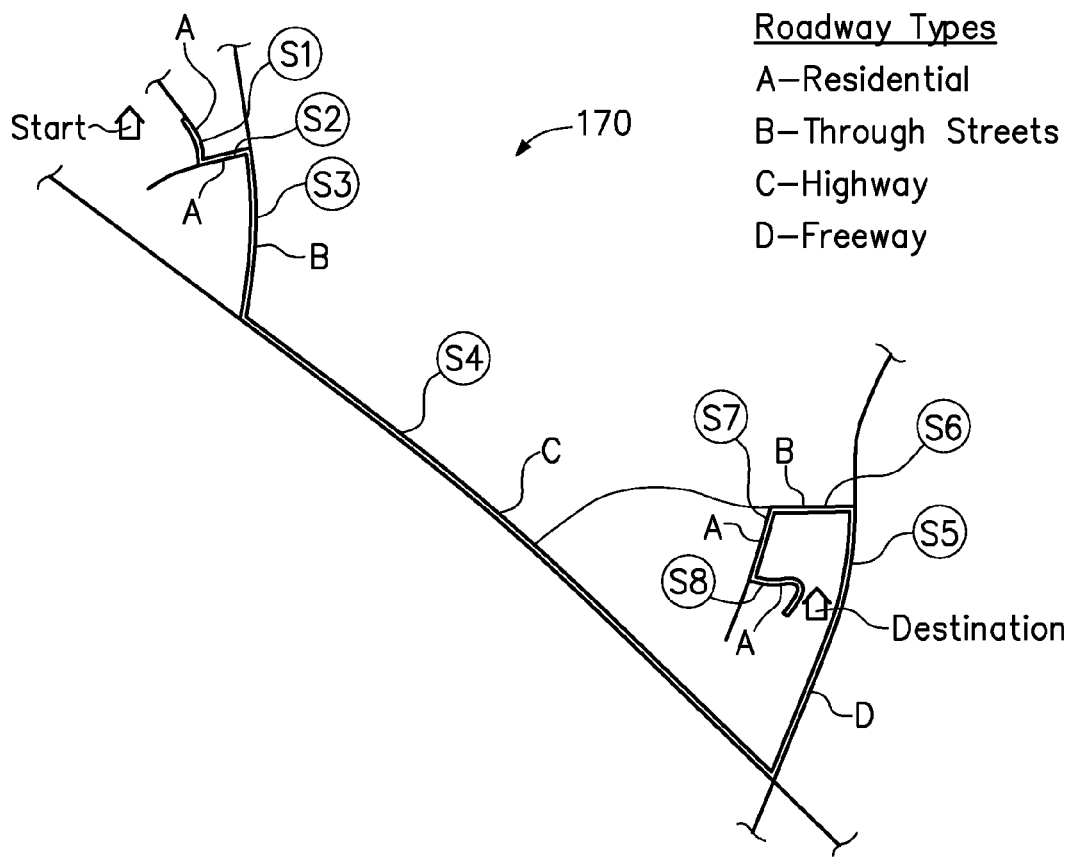
FIG. 4 is an illustration of a map produced from map data.

FIG. 4 is an illustration of a map 170 that might be displayed on a display device 132 of the mobile device 110 using the map data 162. As shown, the lines are roadways, but the bold line illustrates a particular route from a "Start" location to a "Destination." The distance of a given roadway that is part of the route is identified as a roadway segment. As shown, the route has eight roadway segments, labeled S1-S8. Furthermore, each of the roadway segments (S1-S8) has been marked to show its roadway type (A, B, C or D). This map data 170 will be used by the mobile device 110 when calculating a route cost, as discussed later in reference to FIG. 8.

FIG. 5 is a table representing various roadway types. Four roadway types (A, B, C and D) are defined either by a speed limit range or a stop frequency. While the map data may have roadway types previously associated with each roadway or roadway segment, the roadway type definitions may be used by the fuel economy logic 64 of the vehicle control system 10 when determining the vehicle's fuel economy over each of the roadway types. Accordingly, the vehicle control system 10 may not need access to the map data.

FIG. 6 is a table representing a vehicle driving history. The vehicle driving history is acquired and stored by the vehicle control system 10 according to the actual use of the vehicle. As shown, the vehicle driving history has just twelve (12) records for purposes of illustration, but a much larger history would be expected in actual use. The vehicle driving history includes a first record showing that the vehicle had a fuel economy of 21 MPG (miles per gallon of fuel) on a roadway of type A, a second record showing that the vehicle had a fuel economy of 24 MPG on another roadway of type A, a third record showing that the vehicle had a fuel economy of 27 MPG on a roadway of type B, etc.

FIG. 7 is a table representing vehicle fuel economy for each roadway type. Using the vehicle driving history of FIG. 6, the vehicle control system may calculate the vehicle's fuel economy for each roadway type. For example, the vehicle driving history shows that the vehicle drove on roadways of type A four times having a fuel economy of 21, 24, 22 and 23 MPG, respectively. Accordingly, the average fuel economy on a roadway of type A is 22.5 MPG. Similar calculations may be performed for each roadway type.

FIG. 8 is a table representing a route cost calculation. The table illustrates the route cost calculation using one row for each roadway segment within the route. Consistent with the route 170 in FIG. 4, there are eight roadway segments shown, each having a particular roadway type as shown in FIG. 4 and a distance provided as part of the map data. The mobile device obtains the fuel price from a fuel price server. If the route were longer, then refueling might be necessary and the fuel price for calculating the cost of later roadway segments might be different. The fuel economy values are taken from the vehicle fuel economy data in FIG. 7. Furthermore, the map data has identified that Segment 5 (roadway type D) is a tollroad and that a toll of $0.50 will be due. The cost of driving each segment is shown in the right-hand column, and the total cost of the route is shown at the bottom to be $3.19. Similar calculations for alternative routes enable the mobile device to identify the lowest cost route.

Figure 9:
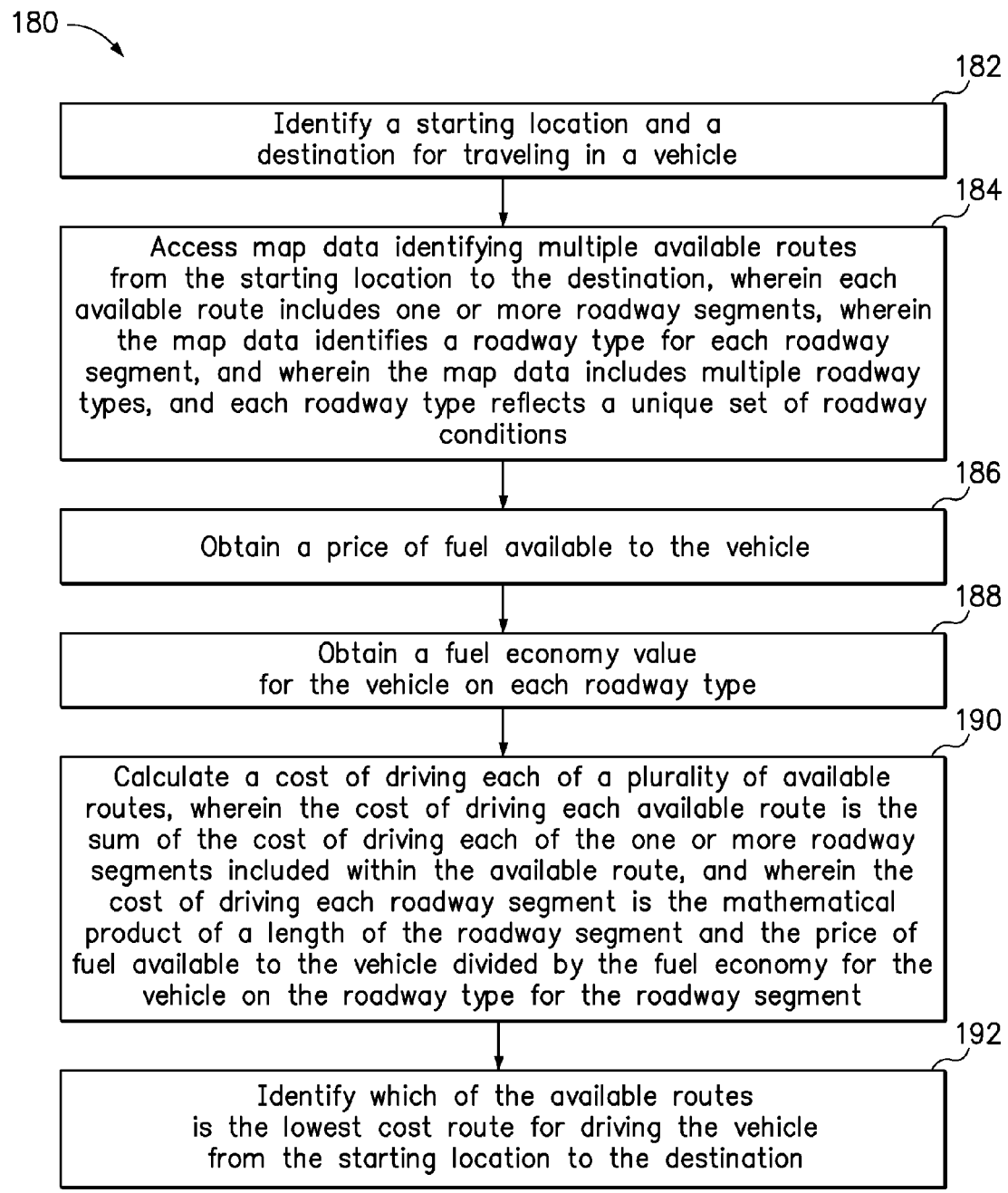
FIG. 9 is a flowchart of a method in accordance with one embodiment of the present invention.

FIG. 9 is a flowchart of a method 180 in accordance with one embodiment of the present invention. In step 182, the method identifies a starting location and a destination for traveling in a vehicle. In step 184, map data identifying multiple available routes from the starting location to the destination is accessed, wherein each available route includes one or more roadway segments, wherein the map data identifies a roadway type for each roadway segment, and wherein the map data includes multiple roadway types, and each roadway type reflects a unique set of roadway conditions. A price of fuel available to the vehicle is obtained in step 186, and a fuel economy value for the vehicle on each roadway type is obtained in step 188.

Step 190 includes calculating a cost of driving each of a plurality of available routes, wherein the cost of driving each available route is the sum of the cost of driving each of the one or more roadway segments included within the available route, and wherein the cost of driving each roadway segment is the mathematical product of a length of the roadway segment and the price of fuel available to the vehicle divided by the fuel economy for the vehicle on the roadway type for the roadway segment. Then, in step 192, the method identifies which of the available routes is the lowest cost route for driving the vehicle from the starting location to the destination.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a computer readable storage medium having program instructions embodied therewith, the program instructions executable by a processor to cause the processor to perform a method comprising: identifying a starting location and a destination for traveling in a vehicle; accessing map data identifying multiple available routes from the starting location to the destination, wherein each available route includes one or more roadway segments, wherein the map data identifies a roadway type for each roadway segment, and wherein the map data includes multiple roadway types, and each roadway type reflects a unique set of roadway conditions; obtaining a price of fuel available to the vehicle; obtaining a fuel economy value for the vehicle on each roadway type; calculating a cost of driving each of a plurality of available routes, wherein the cost of driving each available route is the sum of the cost of driving each of the one or more roadway segments included within the available route, and wherein the cost of driving each roadway segment is the mathematical product of a length of the roadway segment and the price of fuel available to the vehicle divided by the fuel economy for the vehicle on the roadway type for the roadway segment; identifying which of the available routes is the lowest cost route for driving the vehicle from the starting location to the destination; and displaying, on a display screen, the identified route.

2. The computer program product of claim 1, wherein the map data further identifies any toll amount charged for traveling through each roadway segment, and wherein the toll amount associated with each roadway segment is added to the cost of driving the roadway segment.

3. The computer program product of claim 1, wherein obtaining a price of fuel available to the vehicle includes receiving the fuel price in a wireless communication from a refueling pump control system at the time the fuel tank of the vehicle is being filled.

4. The computer program product of claim 1, wherein obtaining a price of fuel available to the vehicle includes manually entering the fuel price.

5. The computer program product of claim 1, wherein obtaining a price of fuel available to the vehicle includes accessing a database of refueling locations and fuel prices associated with each of the refueling locations.

6. The computer program product of claim 1, wherein the roadway types includes a city street and a highway, and wherein obtaining a fuel economy value for the vehicle on each roadway type includes receiving a published value for city fuel economy and a published value for highway fuel economy.

7. The computer program product of claim 1, wherein obtaining a fuel economy value for the vehicle on each roadway type includes:
 determining and storing a driving history for the vehicle, wherein the driving history includes a first fuel economy measured over a plurality of roadway segments of a first roadway type and a second fuel economy measured over a plurality of roadway segments of a second roadway type, wherein fuel economy is a measure of distance traveled per quantity of fuel.

8. The computer program product of claim 7, wherein the driving history for the vehicle includes vehicle speed, and wherein the first fuel economy is measured over roadway segments where the vehicle speed is less than a setpoint speed, and the second fuel economy is measured over roadway segments where the vehicle speed is greater than the setpoint speed.

9. The computer program product of claim 7, wherein the driving history for the vehicle includes vehicle stops, and wherein the first fuel economy is measured over roadway segments where the vehicle stops are more frequent than a setpoint frequency, and the second fuel economy is measured over roadway segments where the vehicle stops are less frequent than the setpoint frequency.

10. The computer program product of claim 7, wherein the first roadway type is a city street and the second roadway type is a highway.

11. The computer program product of claim 7, wherein the driving history is stored in memory associated with a vehicle control system.

12. The computer program product of claim 11, wherein the vehicle control system communicates the first fuel economy and the second fuel economy to a separate navigation device using short range wireless communication.

13. The computer program product of claim 1, wherein the map data identifies a roadway segment as a first segment type if the roadway segment has greater than a setpoint number of stops per distance, and wherein the map data identifies a roadway segment as a second segment type if the roadway segment has less than a setpoint number of stops per distance.

14. The computer program product of claim 1, wherein the map data identifies a roadway segment as a first segment type if the roadway segment has a speed limit less than a setpoint speed, and wherein the map data identifies a roadway segment as a second segment type if the roadway segment has a speed limit greater than a setpoint speed.

15. The computer program product of claim 10, wherein the map data identifies a roadway segment as a second segment type if the roadway segment has a highway designation, and wherein the map data identifies a roadway segment as a first segment type if the roadway segment does not have a highway designation.

16. The computer program product of claim 1, further comprising: displaying, on the display screen, the cost associated with driving the vehicle from the starting location to the destination following the identified route.

17. The computer program product of claim 16, further comprising: displaying, on the display screen, an alternative route and the cost associated with driving the vehicle from the starting location to the destination following the alternative route.

18. The computer program product of claim 17, further comprising: displaying, on the display screen, an estimated duration of traveling the identified route and an estimated duration of traveling the alternative route.

* * * * *